United States Patent
Yamamoto (10) Patent No.: US 8,391,444 B2
(45) Date of Patent: Mar. 5, 2013

(54) IP TELEPHONE SET, IP TELEPHONE SYSTEM, AND DIALING METHOD IN THE IP TELEPHONE SET

(75) Inventor: Takahito Yamamoto, Kanagawa (JP)

(73) Assignee: NEC Inforntia Corporation, Tokyo (JP)

( * ) Notice: Subject to any disclaimer, the term of this patent is extended or adjusted under 35 U.S.C. 154(b) by 1013 days.

(21) Appl. No.: 12/413,292

(22) Filed: Mar. 27, 2009

(65) Prior Publication Data

US 2009/0245478 A1 Oct. 1, 2009

(30) Foreign Application Priority Data

Mar. 31, 2008 (JP) ................................. 2008-092826

(51) Int. Cl.
*H04M 11/00* (2006.01)
(52) U.S. Cl. ............................... 379/37; 379/39; 379/45
(58) Field of Classification Search .................... 379/37, 379/40, 45, 50, 102.02, 102.04, 39
See application file for complete search history.

(56) References Cited

U.S. PATENT DOCUMENTS

| | | | | |
|---|---|---|---|---|
| 4,935,951 A * | 6/1990 | Robinson et al. | | 379/37 |
| 5,142,571 A * | 8/1992 | Suzuki et al. | | 379/279 |
| 5,673,304 A * | 9/1997 | Connor et al. | | 379/45 |
| 6,272,209 B1 * | 8/2001 | Bridger et al. | | 379/27.01 |
| 6,400,803 B1 * | 6/2002 | Tate et al. | | 379/27.06 |
| 6,587,546 B2 * | 7/2003 | Stumer et al. | | 379/37 |
| 6,678,356 B2 * | 1/2004 | Stumer et al. | | 379/37 |
| 6,850,599 B2 * | 2/2005 | Yoshitani | | 379/37 |
| 7,012,994 B2 * | 3/2006 | Jung | | 379/45 |
| 7,082,191 B1 * | 7/2006 | Dickens | | 379/200 |
| 2002/0136359 A1 * | 9/2002 | Stumer et al. | | 379/37 |
| 2004/0196868 A1 * | 10/2004 | King | | 370/468 |
| 2005/0141675 A1 * | 6/2005 | Jung | | 379/45 |
| 2006/0221938 A1 * | 10/2006 | Lin et al. | | 370/352 |
| 2007/0058615 A1 * | 3/2007 | Hasenfang et al. | | 370/352 |
| 2008/0160953 A1 * | 7/2008 | Mia et al. | | 455/404.2 |
| 2009/0227223 A1 * | 9/2009 | Jenkins | | 455/404.1 |
| 2011/0263219 A1 * | 10/2011 | Hasenfang et al. | | 455/404.2 |

FOREIGN PATENT DOCUMENTS

| | | | |
|---|---|---|---|
| JP | 2001217929 A | 8/2001 |
| JP | 2005005875 A | 1/2005 |
| JP | 2005026898 A | 1/2005 |
| JP | 2005086286 A | 3/2005 |
| JP | 2005318220 A | 11/2005 |
| JP | 2006211097 A | 8/2006 |

OTHER PUBLICATIONS

Japanese Office Action for JP2008-092826 issued Nov. 16, 2011.
Japanese Office Action for JP2008-092826 mailed on May 9, 2012.

* cited by examiner

*Primary Examiner* — Binh Tieu (57) ABSTRACT

An IP telephone set 4 is provided with a power failure adapter 5. During power failure, a function of the power failure adapter 5 is enabled so that the IP telephone set 4 is connected to an analog network 3 via the power failure adapter 5. As a result, the IP telephone set 4 is allowed to perform telephone communication via the analog network 3. The IP telephone set 4 includes an emergency call detecting portion 40*a* and a transmitting portion 40*b*. The emergency call detection portion 40*a* detects that an emergency telephone number is dialed as a dialed emergency telephone number. The transmitting portion 40*b* enables the function of the power failure adapter 5 when the emergency call detecting portion 40*a* detects that the emergency telephone number is dialed and transmits the dialed emergency telephone number to the analog network 3 via the power failure adapter 5.

15 Claims, 5 Drawing Sheets

IP TELEPHONE SET, IP TELEPHONE SYSTEM, AND DIALING METHOD IN THE IP TELEPHONE SET

This application is based upon and claims the benefit of priority from Japanese patent application No. 2008-092826, filed on Mar. 31, 2008, the disclosure of which is incorporated herein in its entirety by reference.

BACKGROUND OF THE INVENTION

This invention relates to an IP telephone set, an IP telephone system having the IP telephone set, and a dialing method in the IP telephone set.

JP-A-2005-26898 (Patent Document 1) discloses an emergency connection system. As briefly stated in the abstract of the above-referenced publication, in the emergency connection system, an IP (Internet Protocol) telephone set is connected, in a normal mode, to an IP network to perform telephone communication as an extension telephone set under control of an IP-PBX (Internet Protocol-Private Branch eXchange). If a failure occurs on the IP network or a power supply is disconnected or interrupted due to power failure or the like, the IP telephone set is connected to a general public network via a gateway to perform telephone communication as an outside line telephone set.

SUMMARY OF THE INVENTION

However, the above-mentioned emergency connection system is disadvantageous in the following respect. In the normal mode without IP network failure and power supply interruption, if an emergency telephone number is dialed on the IP telephone set, a dial signal is transmitted via the IP network. Therefore, if a failure occurs in the IP network after dialing, voice delay, voice interruption, and the like after dialing are caused to occur. Thus, quality and speed of telephone communication are not ensured.

Further, since an IP telephone numbering system is not yet established, it is not possible to identify a caller and an area. Therefore, in case where a line is disconnected or interrupted, it is impossible to call back from a police department or a fire department to a caller.

It is therefore an exemplary object of the present invention to enable reliable telephone communication with an emergency call destination when an emergency telephone number is dialed from an IP telephone set.

According to a first exemplary aspect of this invention, there is provided an IP telephone set having a power failure adapter whose function is enabled during power failure so that the IP telephone set is connected to an analog network via the power failure adapter and is allowed to perform telephone communication via the analog network, the IP telephone set comprising:

an emergency call detecting portion for detecting that an emergency telephone number is dialed as a dialed emergency telephone number; and a call transmitting portion for enabling the function of the power failure adapter when the emergency call detecting portion detects that the emergency telephone number is dialed and transmitting the dialed emergency telephone number to the analog network via the power failure adapter.

According to a second exemplary aspect of this invention, there is provided an IP telephone system comprising an IP-PBX and an IP telephone set, the IP telephone set being connected, in a normal mode, to the IP-PBX via an IP network and allowed to perform telephone communication via the IP network and the IP-PBX, wherein:

the IP telephone set has a power failure adapter whose function is enabled during power failure so that the IP telephone set is connected to an analog network via the power failure adapter and is allowed to perform telephone communication via the analog network, the IP telephone set comprising:

an emergency call detecting portion for detecting that an emergency telephone number is dialed as a dialed emergency telephone number; and a call transmitting portion for enabling the function of the power failure adapter when the emergency call detecting portion detects that the emergency telephone number is dialed and for transmitting the dialed emergency telephone number to the analog network via the power failure adapter.

According to a third aspect of this invention, there is provided a dialing method in an IP telephone set having a power failure adapter whose function is enabled during power failure so that the IP telephone set is connected to an analog network via the power failure adapter and is allowed to perform telephone communication via the analog network, wherein the dialing method comprises:

an emergency call detecting step of detecting that an emergency telephone number is dialed as a dialed emergency telephone number; and a call transmitting step of enabling the function of the power failure adapter when the emergency call detecting step detects that the emergency telephone number is dialed and transmitting the dialed emergency telephone number to the analog network via the power failure adapter.

According to the present invention, when the emergency telephone number is dialed on the IP telephone set, the emergency telephone number can be transmitted via the analog network. Therefore, reliable telephone communication can be performed.

According to the present invention, detection is made that an emergency telephone number is dialed as a dialed emergency telephone number. When it is detected that the emergency telephone number is dialed, the function of the power failure adapter is enabled. As a result, the dialed emergency telephone number is transmitted via the power failure adapter to the analog network. The above-mentioned characteristic of the present invention is not disclosed in Patent Document 1.

DESCRIPTION OF THE EXEMPLARY EMBODIMENT

Next, an exemplary embodiment of the present invention will be described with reference to the drawing.

Figure 1:
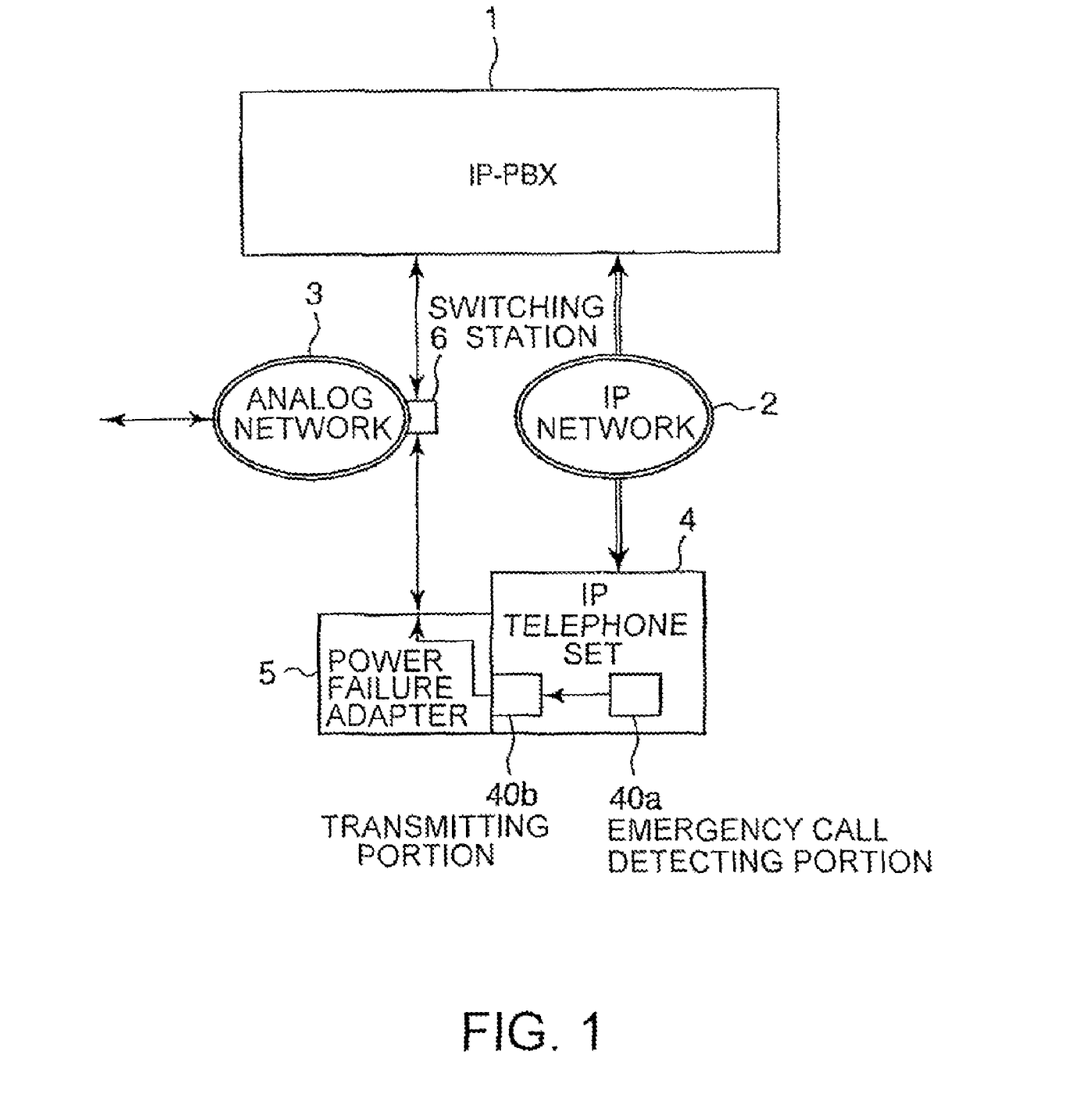
FIG. 1 is a block diagram of an IP telephone system according to an exemplary embodiment of the present invention.

Referring to FIG. 1, an IP telephone system according to the embodiment of the present invention includes an IP-PBX (Internet Protocol-Private Branch eXchange) 1 and an IP telephone set 4. In a normal mode, the IP telephone set 4 is connected to the IP-PBX 1 via an IP network 2 and is allowed to perform telephone communication via the IP network 2 and the IP-PBX 1. In this case for example, the IP telephone set 4 is allowed to perform telephone communication via the IP network 2, the IP-PBX 1, a switching station 6 connected to an analog network 3, and the analog network 3.

The IP telephone set 4 is directly connected to a power failure adapter 5. In case of power failure, a function of the power failure adapter 5 is enabled so that the IP telephone set 4 is connected to the analog network 3 via the power failure adapter 5 and is allowed to perform telephone communication via the analog network 3. In this case, the IP telephone set 4 is enabled to perform telephone communication via the power failure adapter 5, the switching station 6, and the analog network 3.

The IP telephone set 4 is provided with an emergency call detecting portion 40*a* and a transmitting portion 40*b*. The emergency call detecting portion 40*a* serves to detect that an emergency telephone number is dialed as a dialed emergency telephone number. The transmitting portion 40*b* enables the function of the power failure adapter 5 when the emergency call detecting portion 40*a* detects that the emergency telephone number is dialed and transmits the dialed emergency telephone number to the analog network 3 via the power failure adapter 5.

As the emergency telephone number, for example, "119" for ambulance service and "110" for assistance by police are used in Japan.

Figure 2:
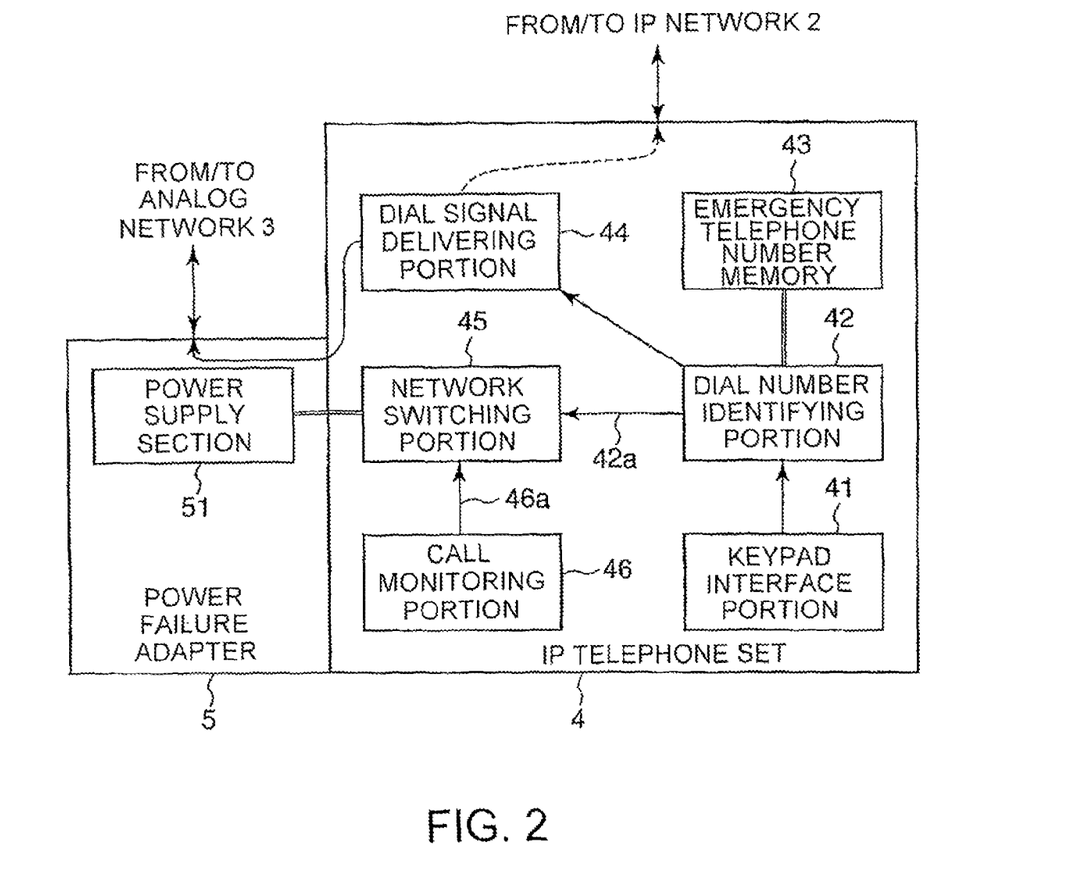
FIG. 2 is a block diagram showing one example of an IP telephone set and a power failure adapter in FIG. 1.

Referring to FIG. 2, the IP telephone set 4 includes a keypad interface portion 41, a dial number identifying portion 42, an emergency telephone number memory 43 storing emergency telephone numbers, a dial signal delivering portion 44, a network switching portion 45, and a call monitoring portion 46.

Figure 3:
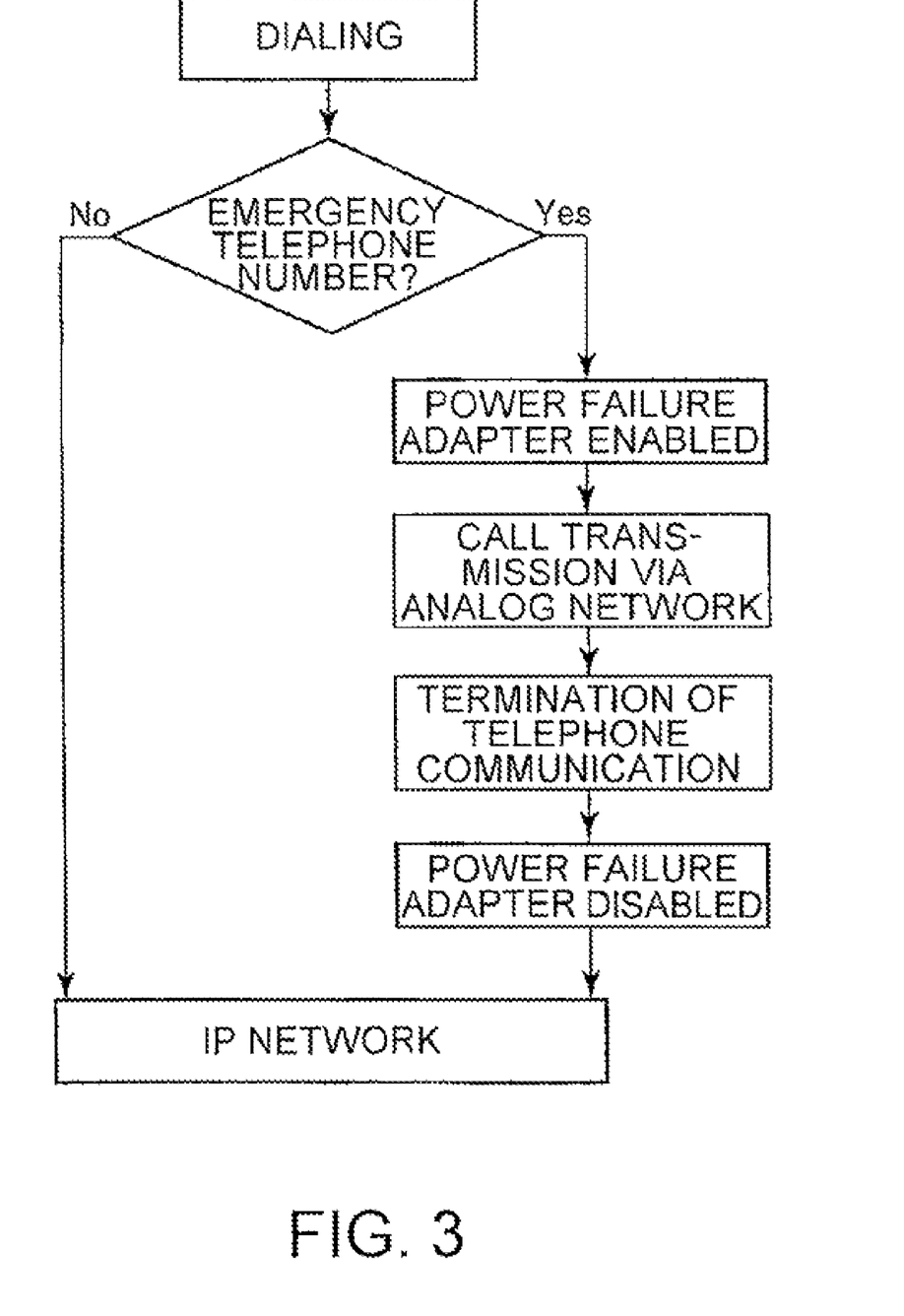
FIG. 3 is a flow chart for describing an operation of the IP telephone set illustrated in FIG. 2.

Next referring to FIGS. 2 and 3 in combination, an operation of the IP telephone set according to the embodiment of the present invention will be described.

The keypad interface portion 41 in the IP telephone set 4 is an interface for a user to dial a telephone number as a dialed telephone number.

The dial number identifying portion 42 obtains the dialed telephone number from the keypad interface portion 41 and compares the dialed telephone number with the emergency telephone numbers stored in the emergency telephone number memory 43.

If the dialed telephone number is coincident with none of the emergency telephone numbers, the dial number identifying portion 42 transmits the dialed telephone number from the dial signal delivering portion 44 via the IP network 2.

If the dialed telephone number is coincident with any one of the emergency telephone numbers, the dial number identifying portion 42 notifies the network switching portion 45 of emergency telephone number detection information 42*a*.

Obtaining the emergency telephone number detection information 42*a*, the network switching portion 45 turns on a power supply section 51 of the power failure adapter 5. Accordingly, the function of the power failure adapter 5 is enabled. As a result, an IP network interface with the IP network 2, which has been enabled or operative in the normal mode (namely, not during power failure but during power supply), is switched to an analog network interface with the analog network 3 via the power failure adapter 5. Then, the dialed emergency telephone number is transmitted from the dial signal delivering portion 44 to an emergency call destination via the power failure adapter 5 and the analog network 3.

When telephone communication with the emergency call destination via the power failure adapter 5 and the analog network 3 is terminated, the call monitoring portion 46 transmits emergency telephone number call termination information 46*a* to the network switching portion 45. When the emergency telephone number call termination information 46*a* is received, the network switching portion 45 turns off the power supply section 51 of the power failure adapter 5. As a result, the analog network interface with the analog network 3 is switched to the IP network interface with the IP network 2. Thus, the IP telephone set 4 is put into the normal mode (namely, not during power failure but during power supply).

As mentioned above, a combination of the dial number identifying portion 42 and the emergency telephone number memory 43 in FIG. 2 functions as the emergency call detecting portion 40*a* (FIG. 1) for detecting that the emergency telephone number is dialed. On the other hand, a combination of the network switching portion 45 and the dial signal delivering portion 44 in FIG. 2 functions as the transmitting portion 40*b* (FIG. 1) which enables the function of the power failure adapter 5 when the emergency call detecting portion 40*a* (FIG. 1) detects that the emergency telephone number is dialed and which transmits the dialed emergency telephone number to the analog network 3 via the power failure adapter 5.

In FIG. 2, the call monitoring portion 46 functions as a call termination detecting portion for detecting, after transmission of the dialed emergency telephone number toward the emergency call destination, call termination with the emergency call destination.

In FIG. 2, the network switching portion 45 functions as a functioning portion for disabling the function of the power failure adapter 5 when the call monitoring portion (call termination detecting portion) 46 detects the call termination and for restoring the normal mode in which the IP telephone set 4 is connected to the IP network 2 and is allowed to perform telephone communication via the IP network 2 and the IP-PBX 1.

In FIG. 2, the call monitoring portion 46 may function as a call termination detecting portion for detecting call termination by a return call from the emergency call destination (a fire department, a police department or the like) after transmission of the dialed emergency telephone number toward the emergency call destination. In this case, when the call termination by the return call is detected, the network switching portion 45 disables the function of the power failure adapter 5 and restores the normal mode in which the IP telephone set 4 is connected to the IP network 2 and is allowed to perform telephone communication via the IP network 2 and the IP-PBX 1.

Figure 4:
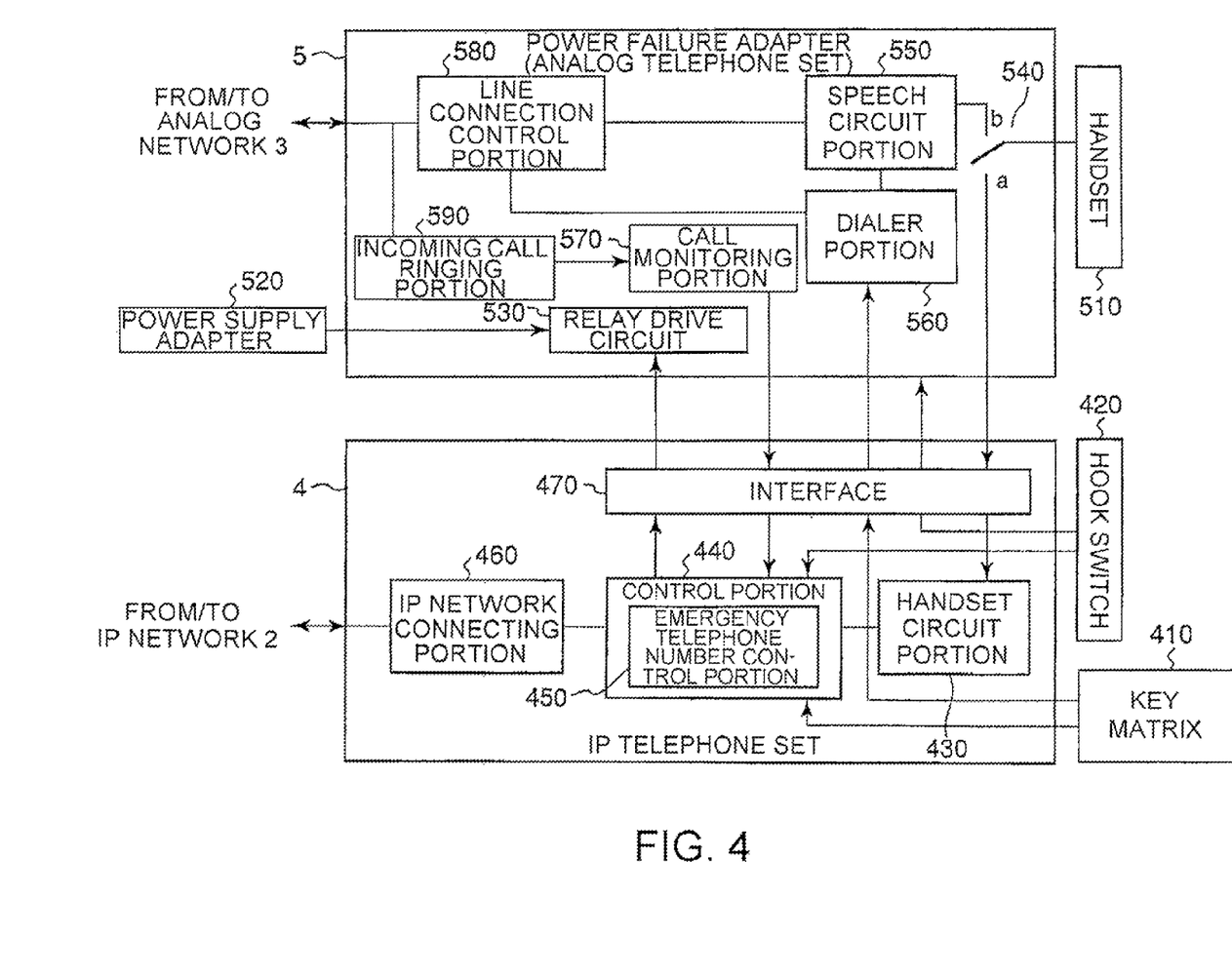
FIG. 4 is a block diagram showing another example of the IP telephone set and the power failure adapter in FIG. 1.

Referring to FIG. 4, another example of the IP telephone set 4 and the power failure adapter 5 in FIG. 1 will be described.

In FIG. 4, operation of the power failure adapter 5 is as follows. In the normal mode, a relay drive circuit 530 is operated or activated by a power supply adapter 520. A relay contact 540 is switched to a contact terminal "a" so that a handset 510 is connected to the IP telephone set 4, specifically, to a control portion 440 via an interface 470 and a handset circuit portion 430. A hook switch 420 is also connected to the control portion 440. The control portion 440 is connected to the IP network 2 via an IP network connecting portion 460.

On the other hand, during power failure, the relay drive circuit 530 is inoperative. The relay contact 540 is switched to a contact terminal "b" so that the handset 510 is connected to the power failure adapter 5. Thus, the power failure adapter (analog telephone set) 5 can deal with an operation in case of power failure. In this event, the handset 510 is connected to the analog network 3 via a speech circuit portion 550 and a line connection control portion 580. A dialer portion 560 is connected to the analog network 3 via the line connection control portion 580. An incoming call ringing portion 590 is connected to the analog network 3.

Herein, description will be returned to the operation in the normal mode. In the IP telephone set 4 in the normal mode, an emergency telephone number control portion 450 of the control portion 440 has a function of comparing the emergency telephone numbers preliminarily stored and an input telephone number entered from a key matrix 410 and, if the input telephone number is coincident with any one of the emergency telephone numbers, delivering a coincident signal to the power failure adapter 5.

The key matrix 410 has a double contact structure and is operable as a key for the power failure adapter (analog telephone set) 5 and the IP telephone set 4.

The input telephone number entered from the key matrix 410 by the user is identified by the emergency telephone number control portion 450 of the IP telephone set 4. Then, the input telephone number is compared with the emergency telephone numbers preliminarily stored. If the input telephone number is coincident with any one of the emergency telephone numbers, the emergency telephone number control portion 450 delivers a coincident signal to the relay drive circuit 530 of the power failure adapter (analog telephone set) 5. In response to the coincident signal also, the relay contact 540 is switched to the contact terminal "b" to switch the handset 510 toward the power failure adapter (analog telephone set) 5.

In this event, the handset 510 is connected to the analog network 3 via the speech circuit portion 550 and the line connection control portion 580.

As mentioned above, in a state where the power failure adapter 5 is connected to the IP telephone set 4, it is detected that the emergency telephone number is dialed. Then, connection is switched from the IP telephone set 4 to the power failure adapter (analog telephone set) 5. Thus, when an emergency call is originated, telephone communication with the emergency call destination is enabled.

As the emergency telephone number, for example, "119" for ambulance service and "110" for assistance by police are used in Japan.

When termination of telephone communication with the emergency call destination having the emergency telephone number is detected, a call monitoring portion 570 supplies a call termination detecting signal to the relay drive circuit 530 via the interface 470 and the control portion 440. As a result, the relay contact 540 is switched to the contact terminal "a" so that the handset 510 is connected to the IP telephone set 4.

In detail, the call monitoring portion 570 of the power failure adapter (analog telephone set) 5 memorizes the fact that the emergency telephone number has been dialed. When a callback signal by a return call from the emergency call destination is received, the power failure adapter (analog telephone set) 5 can answer the return call and perform telephone communication as a telephone set which has dialed the emergency telephone number. After the telephone communication by the emergency telephone number is terminated, the power failure adapter 5 which has been used as the analog telephone set is switched to the IP telephone set 4.

Figure 5:
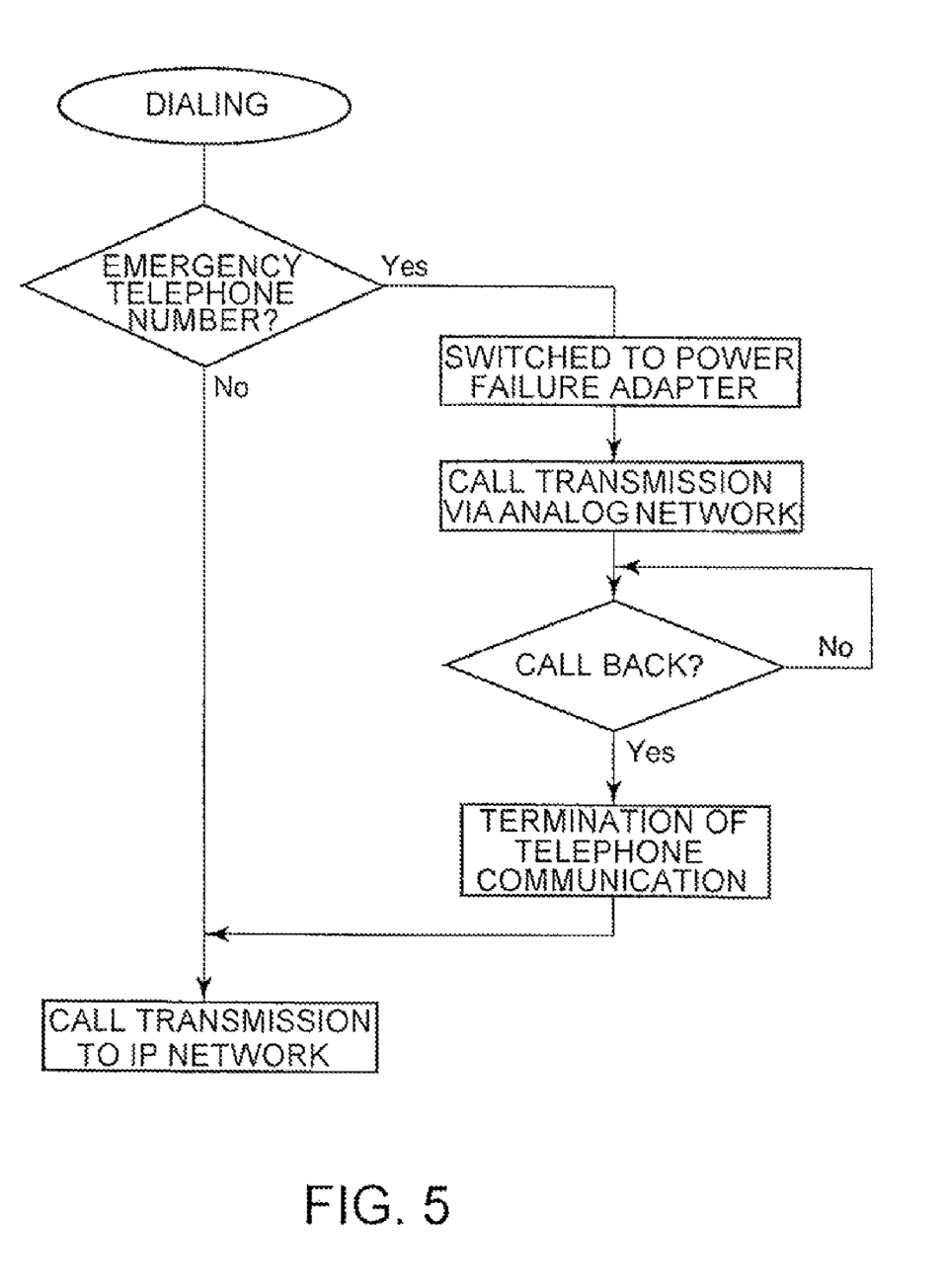
FIG. 5 is a flow chart for describing an operation of the IP telephone set illustrated in FIG. 4.

FIG. 5 is a flow chart showing the above-mentioned operation of the IP telephone set 4 in FIG. 4.

While the invention has been particularly shown and described with reference to the exemplary embodiment thereof, the invention is not limited to the embodiment. It will be understood by those of ordinary skill in the art that various changes in form and details may be made therein without departing from the spirit and scope of this invention as defined by the claims.

What is claimed is:

1. An IP telephone set having a power failure adapter whose function is enabled during power failure so that the IP telephone set is connected to an analog network via the power failure adapter and is allowed to perform telephone communication via the analog network, the IP telephone set comprising:
    an emergency call detecting portion for detecting that an emergency telephone number is dialed as a dialed emergency telephone number; and
    a call transmitting portion for enabling the function of the power failure adapter when the emergency call detecting portion detects that the emergency telephone number is dialed and transmitting the dialed emergency telephone number to the analog network via the power failure adapter.

2. The IP telephone set as claimed in claim 1, wherein, in a normal mode, the IP telephone set is connected to an IP network and is allowed to perform telephone communication via the IP network.

3. The IP telephone set as claimed in claim 1, wherein, in a normal mode, the IP telephone set is connected to an IP-PBX via an IP network and is allowed to perform telephone communication via the IP network and the IP-PBX.

4. The IP telephone set as claimed in claim 2, further comprising:
    a call termination detecting portion for detecting, after the dialed emergency telephone number is transmitted toward an emergency call destination, termination of telephone communication with the emergency call destination; and
    a portion for disabling the function of the power failure adapter when the call termination detecting portion detects the termination of telephone communication and restoring the normal mode in which the IP telephone set is connected to the IP network and is allowed to perform telephone communication via the IP network.

5. The IP telephone set as claimed in claim 3, further comprising:
    a call termination detecting portion for detecting, after the dialed emergency telephone number is transmitted toward an emergency call destination, termination of telephone communication with the emergency call destination; and
    a portion for disabling the function of the power failure adapter when the call termination detecting portion detects the termination of telephone communication and restoring the normal mode in which the IP telephone set is connected to the IP network and is allowed to perform telephone communication via the IP network and the IP-PBX.

6. The IP telephone set as claimed in claim 2, further comprising:
    a call termination detecting portion for detecting, after the dialed emergency telephone number is transmitted toward an emergency call destination, termination of telephone communication by a return call from the emergency call destination; and
    a portion for disabling the function of the power failure adapter when the call termination detecting portion detects the termination of telephone communication and restoring the normal mode in which the IP telephone set is connected to the IP network and is allowed to perform telephone communication via the IP network.

7. The IP telephone set as claimed in claim 3, further comprising:
   a call termination detecting portion for detecting, after the dialed emergency telephone number is transmitted toward an emergency call destination, termination of telephone communication by a return call from the emergency call destination; and
   a portion for disabling the function of the power failure adapter when the call termination detecting portion detects the termination of telephone communication and restoring the normal mode in which the IP telephone set is connected to the IP network and is allowed to perform telephone communication via the IP network and the IP-PBX.

8. An IP telephone system comprising an IP-PBX and an IP telephone set, the IP telephone set being connected, in a normal mode, to the IP-PBX via an IP network and allowed to perform telephone communication via the IP network and the IP-PBX, wherein:
   the IP telephone set has a power failure adapter whose function is enabled during power failure so that the IP telephone set is connected to an analog network via the power failure adapter and is allowed to perform telephone communication via the analog network,
   the IP telephone set comprising:
   an emergency call detecting portion for detecting that an emergency telephone number is dialed as a dialed emergency telephone number; and
   a call transmitting portion for enabling the function of the power failure adapter when the emergency call detecting portion detects that the emergency telephone number is dialed and for transmitting the dialed emergency telephone number to the analog network via the power failure adapter.

9. The IP telephone system as claimed in claim 8, wherein the IP telephone set further comprises:
   a call termination detecting portion for detecting, after the dialed emergency telephone number is transmitted toward an emergency call destination, termination of telephone communication with the emergency call destination; and
   a portion for disabling the function of the power failure adapter when the call termination detecting portion detects the termination of telephone communication and restoring the normal mode in which the IP telephone set is connected to the IP network and is allowed to perform telephone communication via the IP network and the IP-PBX.

10. The IP telephone system as claimed in claim 8, wherein the IP telephone set further comprises:
    a call termination detecting portion for detecting, after the dialed emergency telephone number is transmitted toward an emergency call destination, termination of telephone communication by a return call from the emergency call destination; and
    a portion for disabling the function of the power failure adapter when the call termination detecting portion detects the termination of telephone communication and restoring the normal mode in which the IP telephone set is connected to the IP network and is allowed to perform telephone communication via the IP network and the IP-PBX.

11. A dialing method in an IP telephone set having a power failure adapter whose function is enabled during power failure so that the IP telephone set is connected to an analog network via the power failure adapter and is allowed to perform telephone communication via the analog network, wherein the dialing method comprises:
    an emergency call detecting step of detecting, in the IP telephone set, that an emergency telephone number is dialed as a dialed emergency telephone number; and
    a call transmitting step of enabling, in the IP telephone set, the function of the power failure adapter when the emergency call detecting step detects, in the IP telephone set, that the emergency telephone number is dialed and transmitting, in the IP telephone set, the dialed emergency telephone number to the analog network via the power failure adapter.

12. The dialing method as claimed in claim 11, wherein, in a normal mode, the IP telephone set is connected to an IP network and is allowed to perform telephone communication via the IP network,
    the dialing method further comprising:
    a call termination detecting step of detecting in the IP telephone set, after the dialed emergency telephone number is transmitted toward an emergency call destination, termination of telephone communication with the emergency call destination; and
    a step of disabling, in the IP telephone set, the function of the power failure adapter when the call termination detecting step detects, in the IP telephone set, the termination of telephone communication and restoring, in the IP telephone set, the normal mode in which the IP telephone set is connected to the IP network and is allowed to perform telephone communication via the IP network.

13. The dialing method as claimed in claim 11, wherein, in a normal mode, the IP telephone set is connected to an IP-PBX via an IP network and is allowed to perform telephone communication via the IP network and the IP-PBX,
    the dialing method further comprising:
    a call termination detecting step of detecting in the IP telephone set, after the dialed emergency telephone number is transmitted toward an emergency call destination, termination of telephone communication with the emergency call destination; and
    a step of disabling, in the IP telephone set, the function of the power failure adapter when the call termination detecting step detects, in the IP telephone set, the termination of telephone communication and restoring, in the IP telephone set, the normal mode in which the IP telephone set is connected to the IP network and is allowed to perform telephone communication via the IP network and the IP-PBX.

14. The dialing method as claimed in claim 11, wherein, in a normal mode, the IP telephone set is connected to an IP network and is allowed to perform telephone communication via the IP network,
    the dialing method further comprising:
    a call termination detecting step of detecting in the IP telephone set, after the dialed emergency telephone number is transmitted toward an emergency call destination, termination of telephone communication by a return call from the emergency call destination; and
    a step of disabling the function of the power failure adapter when the call termination detecting step detects, in the IP telephone set, the termination of telephone communication and restoring, in the IP telephone set, the normal mode in which the IP telephone set is connected to the IP network and is allowed to perform telephone communication via the IP network.

15. The dialing method as claimed in claim 11, wherein, in a normal mode, the IP telephone set is connected to an IP-PBX via an IP network and is allowed to perform telephone communication via the IP network and the IP-PBX, the dialing method further comprising:
a call termination detecting step of detecting in the IP telephone set, after the dialed emergency telephone number is transmitted toward an emergency call destination, termination of telephone communication by a return call from the emergency call destination; and a step of disabling, in the IP telephone set, the function of the power failure adapter when the call termination detecting step detects, in the IP telephone set, the termination of telephone communication and restoring, in the IP telephone set, the normal mode in which the IP telephone set is connected to the IP network and is allowed to perform telephone communication via the IP network and the IP-PBX.

* * * * *